United States Patent
Singhal et al.

(10) Patent No.: US 12,501,281 B2
(45) Date of Patent: Dec. 16, 2025

(54) OpenRAN INTELLIGENT DYNAMIC CU-UP SCALING SOLUTION

(71) Applicant: Parallel Wireless, Inc., Nashua, NH (US)

(72) Inventors: Mukesh Singhal, Pune (IN); Amit Ghadge, Pune (IN); Nikhil Agarwal, Pune (IN); Anoop Gupta, Pune (IN); Mahendra Rajput, Bangalore (IN); Vinay Goutham Pullela, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 505 days.

(21) Appl. No.: 17/892,381

(22) Filed: Aug. 22, 2022

(65) Prior Publication Data

US 2023/0063162 A1 Mar. 2, 2023

Related U.S. Application Data

(60) Provisional application No. 63/235,220, filed on Aug. 20, 2021.

(51) Int. Cl.
*H04W 48/18* (2009.01)
*H04L 41/0895* (2022.01)
*H04W 24/02* (2009.01)

(52) U.S. Cl.
CPC ......... *H04W 24/02* (2013.01); *H04L 41/0895* (2022.05)

(58) Field of Classification Search
None
See application file for complete search history.

(56) References Cited

U.S. PATENT DOCUMENTS

2020/0260427 A1 8/2020 Schefczik et al.
2022/0264437 A1* 8/2022 Raghavachari ....... H04W 48/18

* cited by examiner

*Primary Examiner* — Gary Lafontant
(74) *Attorney, Agent, or Firm* — Michael Y. Saji; Ashish Patent

(57) ABSTRACT

A system is disclosed for providing Open RAN CU-UP high availability, the system comprising: at least one active CU-CP; at least one active CU-UP in communication with the at least one active CU-CP; and at least one standby CU-UP in communication with the at least one active CU-CP; wherein when a message may be received from a CU-CP that detects a failure of the at least one active CU-UP, the at least one standby CU-UP may be configured to take over and become an active CU-UP, thereby providing failover redundancy for the at least one active CU-UP.

20 Claims, 8 Drawing Sheets

ID

OpenRAN INTELLIGENT DYNAMIC CU-UP SCALING SOLUTION

CROSS-REFERENCE TO RELATED APPLICATIONS

This application claims priority under 35 U.S.C. § 119(e) to U.S. Provisional Application No. 63/235,220, titled "OpenRAN Intelligent Dynamic CU-UP Scaling Solution" and dated Aug. 20, 2021, which is also hereby incorporated by reference in its entirety. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. patent application Ser. No. 17/867,633, filed Jul. 18, 2022; U.S. patent application Ser. No. 17/838,597, filed Jun. 13, 2022; U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Below is the Open RAN architecture as defined by ORAN alliance.

With 5G there is a need to support dynamic scaling of throughput for efficient utilization of resources and ultra-low latency use cases or applications. Low latency of few milliseconds is one of the needs for applications like Industrial robotics, eHealth, Autonomous vehicles and so on.

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic.

Control & User plane separation has following advantages: separation helps in having separate Data centers tailored to function needs; and Data traffic traverses User Plane Path from RU→DU→CU-UP→Core.

CU-CP function handles the control plane traffic and CU-UP function handles the user plane data traffic. CU-UP function has following advantages: aggregates User Plane traffic from several DU's and abstract number of S1-U/N3 peers from Core; Any DU changes due to handover are masked from the Core; and helps keep DU unaware of Core details.

SUMMARY

TBD

DETAILED DESCRIPTION

Data traffic is growing exponentially in the network. Dynamic scaling of user plane throughput would be required during peak and non-peak hours. During peak and non-peak hours resource requirement gap can be huge. CNF provides framework to achieve as much scaling as needed. Let's assume following numbers for better understanding of problem.

TABLE 1

| Description | non-peak hour | peak hour |
| --- | --- | --- |
| Avg throughput per subscriber | 1 Mbps | 10 Mbps |
| Avg num of subscriber in CU-UP | 10K | 10K |
| Num of DUs on single CU-UP | 10 | 10 |
| CU-UP throughput required | 10 Gbps | 100 Gbps |
| Single Data plane Pod capacity | 20 Gbps | 20 Gbps |
| UP pod required | 1 | 5 |

With 4G & 5G there is a need to support Control and User Plane separation in OpenRAN. There are several benefits of Control and User Plane separation as mentioned in earlier sections.

With Control (CU-CP) and User Plane (CU-UP) separation of CU, CU-UP performance under load is important. CU-UP carries sessions belonging to several subscribers. Failure or congestion of CU-UP can have service impact on subscribers. Need a solution that can minimize the impact. For critical services like emergency calls or eHealth we need a faster recovery (in msecs) whereas for eMBB or IoT recovery can take some time (1 sec).

A scaling solution is needed that can do this scale up or down of pods in CU-UP in way that it doesn't impact the subscribers, no impact to service and has lesser impact on the other network element. Solution proposed has following advantages: intelligent solution taking care of all aspects of CU-UP functioning; without impacting the subscriber and service; has minimal impact on other functions in the network; reduces CU-UP complexity; provides lowest packet latency; dynamic solution that considers the network needs and it doesn't need any manual intervention; makes efficient utilization of resources; increases power consumption efficiency; and reduces cost.

The presently disclosed solution introduces two different ways to support CU-UP scaling. Support is needed in CU-CP and CU-UP.

Advantages of the proposed 4G/5G OpenRAN CU-UP scalability Solution may include, in some embodiments: Provides solution provide scalability solution for CU-UP; No break in subscriber session or service; CU-CP is in control of the solution and acts like a SDN-Controller (software defined network controller) for scaling; and Graceful migration between Active and Standby CU-UP for maintenance and other reasons can be supported.

Figure 1:
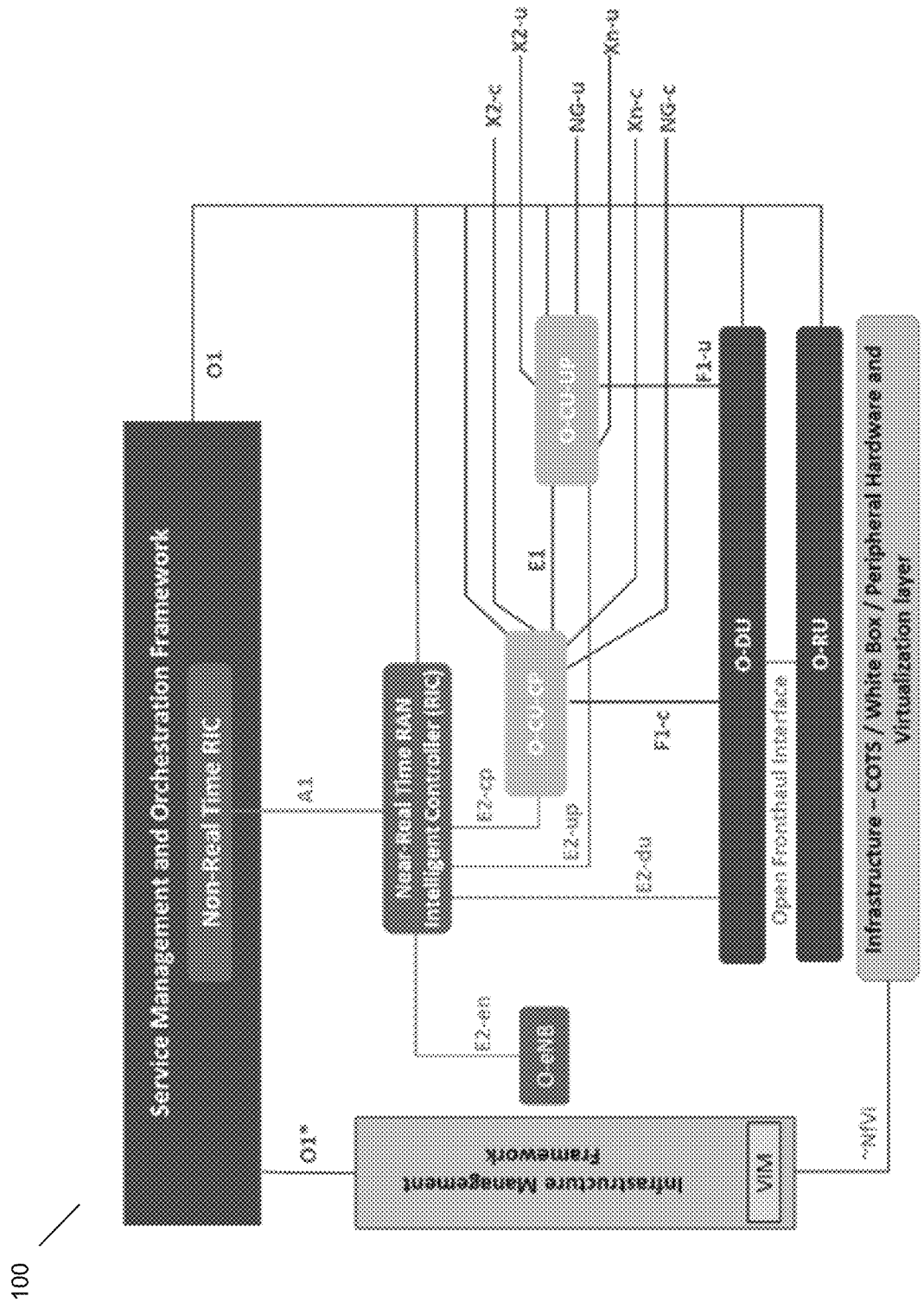
FIG. 1 shows a schematic network architecture diagram with a CU-UP, as known in the prior art.

FIG. 1 shows a schematic network architecture diagram with a CU-UP, as known in the prior art. FIG. 1 depicts a CU-CP managing CU-UP without redundancy and without scaling it can have impact on subscriber sessions or service, since CU-UP handles user plane data traffic; data or sessions may be lost, slowed or both.

FIG. 1 depicts a CU-CP managing CU-UP without redundancy and on congestion or failure it can have impact on subscriber sessions or service, since CU-UP handles user plane data traffic; data may be lost, or sessions may be lost, or both.

Figure 2:
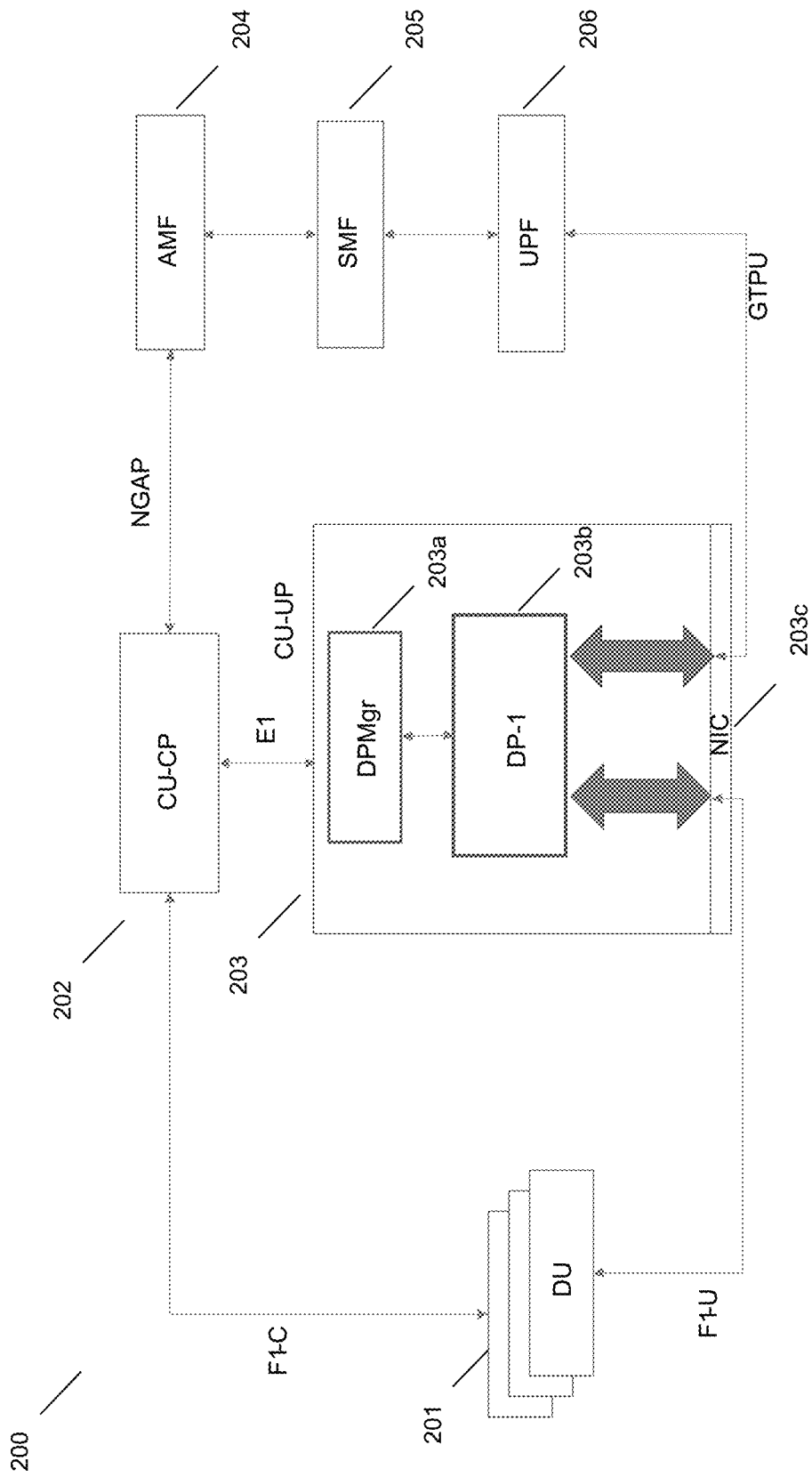
FIG. 2 shows a schematic network architecture diagram with a CU-UP, in accordance with some embodiments.

FIG. 2 shows a schematic network architecture diagram with a CU-UP, in accordance with some embodiments. FIG. 200 shows DUs 201 in communication with CU-CP 202 and CU-UP 203, which are containerized network functions. CU-UP 203 has a data plane coordination module DPMgr 203a and a data plane DP-1 203b, which are CNFs. A network interface card 203c is present as part of CU-UP 203, with some network functions also being CNFs in some embodiments. AMF 204, SMF 205, UPF 206 are also provided for 5GC functions.

An Intelligent Dynamic solution is needed to support scaling for CU-UP in OpenRAN solution. Solution proposed proposes to have CU-UP implemented as a CNF (cloud-native network function or containerized network function, which is a software implementation of a network function running inside a container). CNF provides mechanism for dynamic scaling of any micro-service independently.

For CU-UP scaling in CNF environment, this can be achieved by following approaches: load balancer and without load balancer, in some embodiments.

Figure 3:
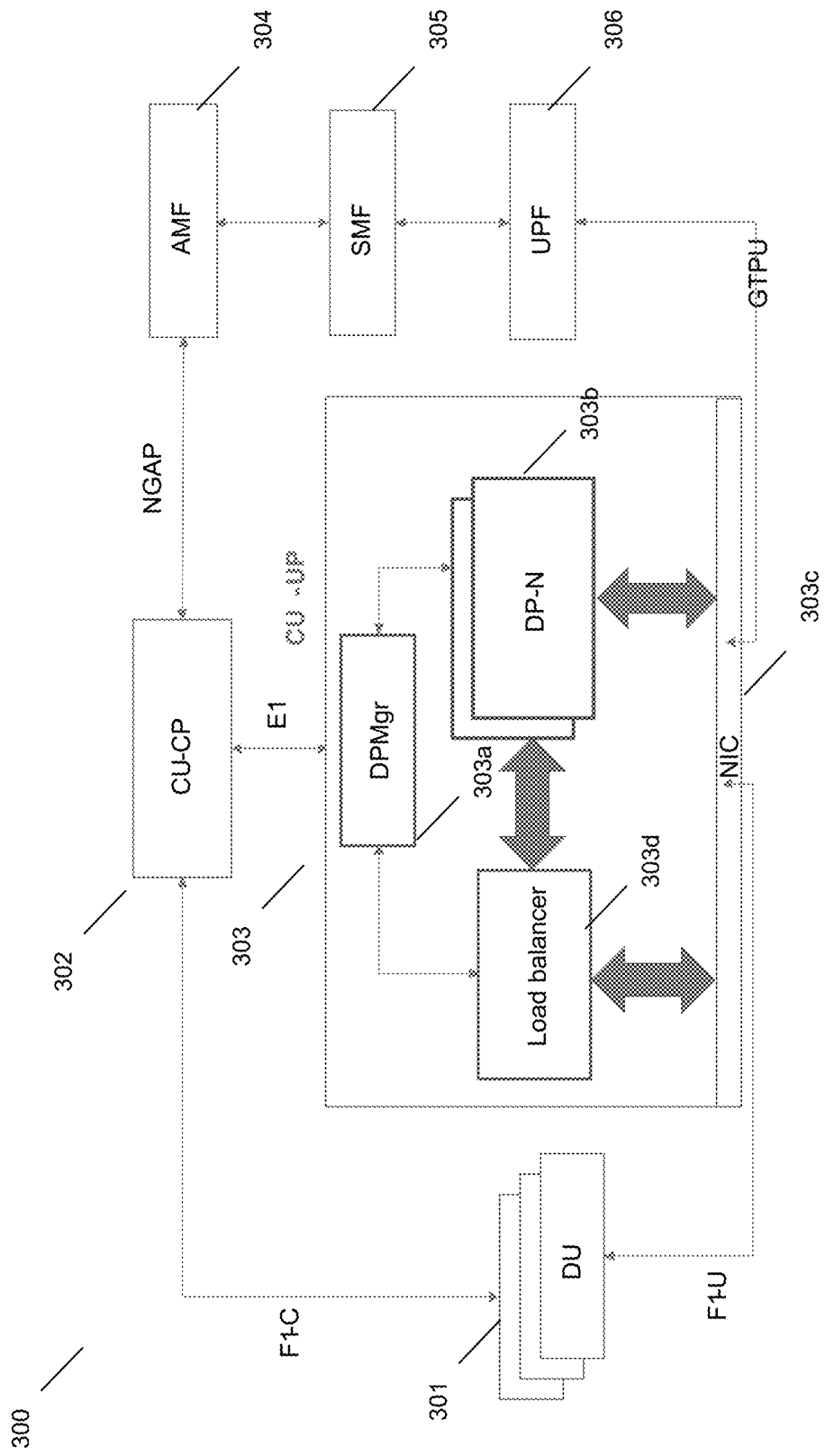
FIG. 3 shows a schematic network architecture diagram with more than one CU-UP and a load balancer, in accordance with some embodiments.

FIG. 3 shows a schematic network architecture diagram 300 with more than one CU-UP and a load balancer, in accordance with some embodiments. A plurality of DUs 301 is in communication with CU-CP 302 and CU-UP 303. CU-UP 303 includes DPMgr 303a, plurality of data planes DP-N 303b, NIC 303c, and load balancer 303d, one or more of which may be CNFs. AMF 304, SMF 305, UPF 306 are also provided for 5GC functions.

Scaling is enabled by load balancer 303d balancing incoming load among DP-N 303b at an initial time of session establishment, such that data use is shared among the different DP-Ns. This .oad balancer embodiment is a way of achieving scaling in CNF environment for non-latency sensitive applications/solutions. But this has a disadvantage of packet having to go through multiple hops within the CU-UP thus leading to higher Packet latency.

Figure 4:
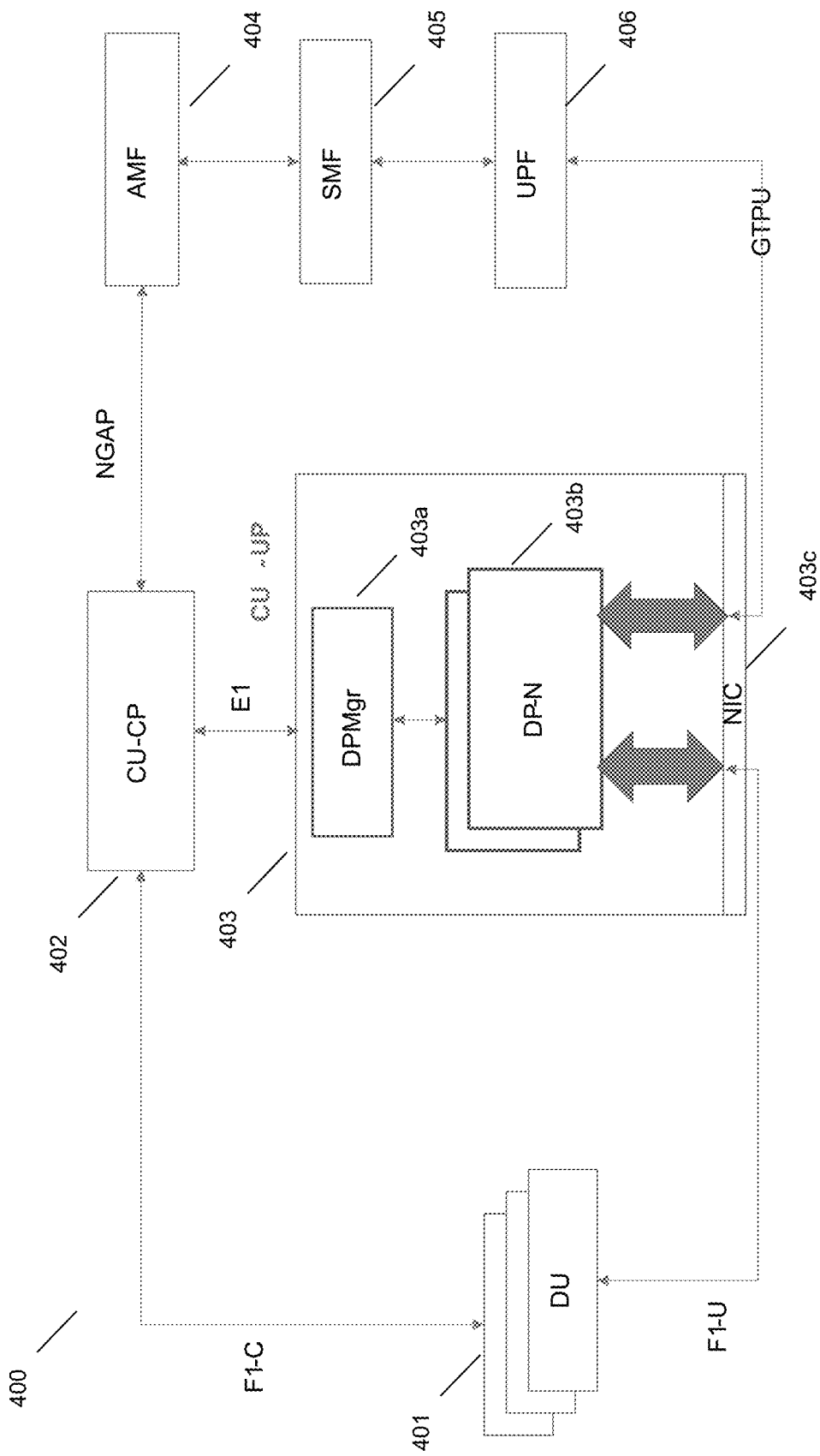
FIG. 4 shows a schematic network architecture diagram with dynamic scaling without load balancer, in accordance with some embodiments.

FIG. 4 shows a schematic network architecture diagram 400 with dynamic scaling without load balancer, in accordance with some embodiments. Plurality of DUs 401 is in communication with CU-CP 402 and CU-UP 403. CU-UP 403 includes DPMgr 403a, which is a CNF, and which coordinates plurality of data planes DP-N 403b, which are in turn each in communication with NIC 403c. No load balancer is needed. AMF 404, SMF 405, UPF 406 are also provided for 5GC functions.

Dynamic scaling without load-balancer (ultra-low latency) embodiment. There is a need for a solution without load-balancer for latency sensitive applications. In this solution new Pods are added/deleted to the CU-UP CNF and while doing that the subscriber sessions are modified to take care of the added/deleted Pods in the CU-UP for scale. Each Pod has its own F1-U or N3 data endpoint. As and when these Pods are added appropriate signaling is done to ensure the sessions utilize the new capacity added or deleted.

There is no provision in 3GPP specification for CU-UP to modify the UEs bearer data endpoints and inform CU-CP for change. This also requires changes in 3GPP specification. Solution proposed here in adds changes to CU-UP, CU-CP & DU to handle the endpoint changes in the event of scale-up or down.

In some embodiments, the CU-UP triggers signaling to update the endpoints of sessions when there is a scale-up/down event. CU-UP initiates the trigger and then CU-CP takes care of notifying the DU and Core network about the change of the CU-UP endpoints.

Advantages of this embodiment include: intelligent solution taking care of all aspects of CU-UP functioning without impacting the subscriber and service. Has minimal impact on other functions in the network. Reduces CU-UP complexity. Provides lowest packet latency. Dynamic solution that considers the network needs and it doesn't need any manual intervention. Makes efficient utilization of resources. Increases power consumption efficiency. Reduces cost.

Additional IPs may be required for each Pod, in some embodiments. Additional signaling may be needed with CU-CP/DU/Core, as described further herein, with specific reference to FIG. 5.

Figure 5:
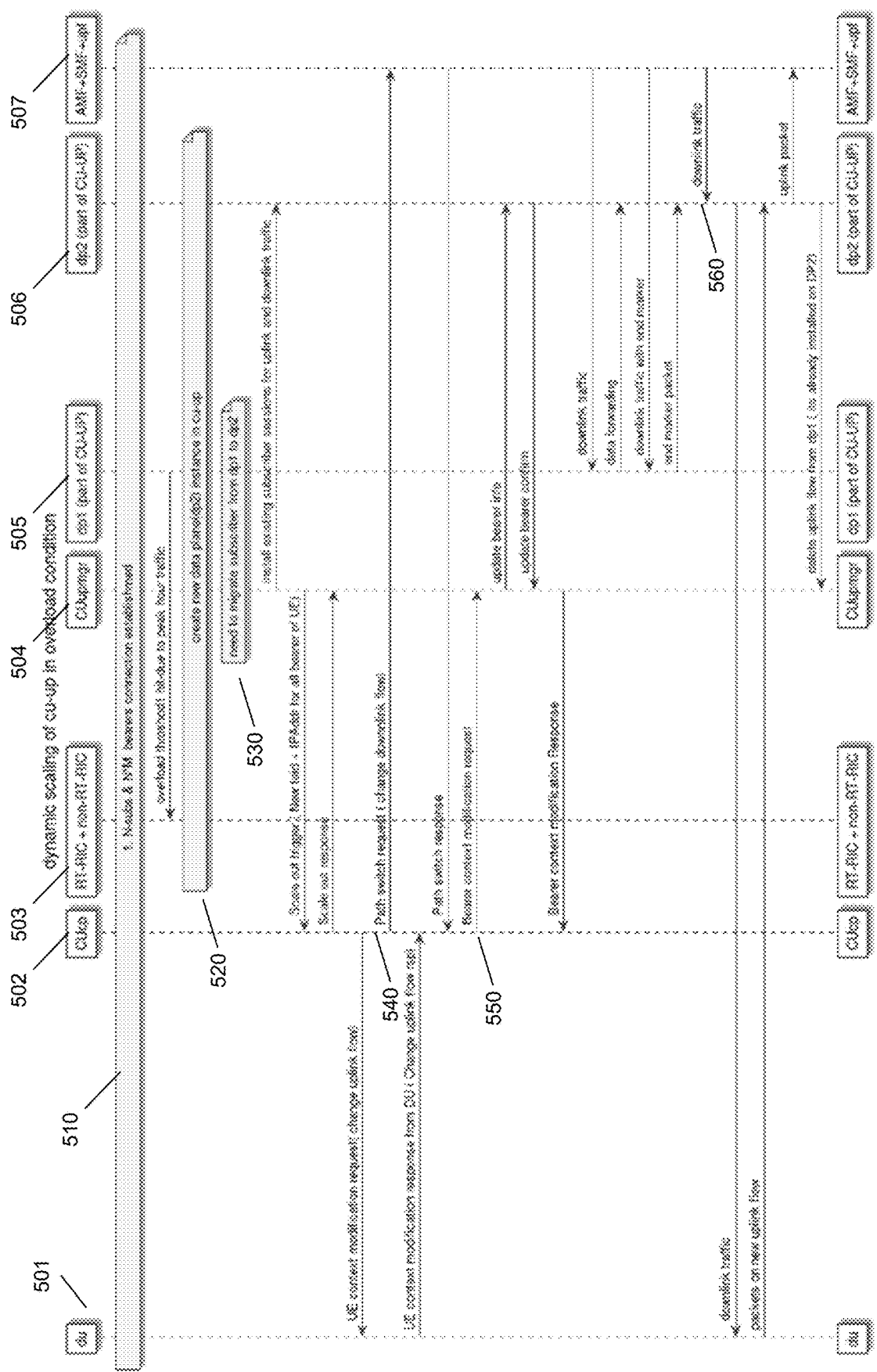
FIG. 5 shows an exemplary call flow, in accordance with some embodiments.

FIG. 5 shows an exemplary call flow, in accordance with some embodiments. The call flow reflects communications among a single DU 501; a CU-CP 502; an RT-RIC/non-RT RIC 503; multiple parts of a CU-UP (CU-UP manager 504, DP1 505, and DP2 506), which are CNFs; and a 5GC (AMF+SMF+UPF). In some embodiments the same call flow could be used with modifications with a 4G core (EPC core).

At step 510, multiple subscribers and bearers are established, but an overload threshold has been hit due to peak hour traffic. At step 520, new data plane instance DP2 506 is created at CU-UP to alleviate the overload. At step 530, a series of messages is initiated to migrate one or more subscribers to DP2. Existing subscriber sessions for uplink and downlink are installed at DP2, and new TEIDs and new IP addresses for all bearers of the existing subscriber are requested from CU-CP. The DU is informed of the change via one or more UE context modification requests from the CU-CP.

Next, at 540, path switch requests are made from CU-CP to the 5GC 507, and if core returns successful, bearers are modified at step 550. Bearer info is updated throughout the system. If downlink data is received while the transition is still happening, it is queued for forwarding to DP2.

At step 560, the new DP2 has been installed, downlink traffic is restored to the DU, and load has been alleviated.

The overload threshold may be usage at the CU-UP data plane, such as network throughput, available network bandwidth, available network resources, CPU usage, disk usage, or another specific measurement of load of the hardware or container, in some embodiments. The overload threshold may be a number of logical resources, such as number of sessions, number of subscribers, number of available TEIDs, number of endpoints, number of connections, etc. in some embodiments. The overload threshold may be any other load-related value, in some embodiments.

In some embodiments, one or more network functions as described herein may be provided by virtualized servers, which may be provided using containerization technology. Containers decouple applications from underlying host infrastructure. This makes deployment easier in different cloud or OS environments. A container image is a ready-to-run software package, containing everything needed to run an application: the code and any runtime it requires, application and system libraries, and default values for any essential settings. Containers may include the use of Kubernetes or other container runtimes/orchestrators.

In Kubernetes, A pod (as in a pod of whales or pea pod) is a group of one or more containers, with shared storage and network resources, and a specification for how to run the containers. A Pod's contents are always co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods are configured in Kubernetes using YAML files.

For example, a controller for a given resource provided using containers handles replication and rollout and automatic healing in case of Pod failure. For example, if a Node fails, a controller notices that Pods on that Node have stopped working and creates a replacement Pod. The scheduler places the replacement Pod onto a healthy Node.

The use of containerized technologies is rapidly spreading for providing 5G core (5GC) technologies. The present disclosure is deployed using containerized technologies, in some embodiments.

A container image represents binary data that encapsulates an application and all its software dependencies. Container images are executable software bundles that can run standalone and that make very well defined assumptions about their runtime environment. You typically create a container image of your application and push it to a registry before referring to it in a Pod This page provides an outline of the container image concept. Image names Container images are usually given a name such as pause, example/mycontainer, or kube-apiserver. Containerized services that include container images and orchestration are a common way to provide microservices, in some embodiments.

Figure 6:
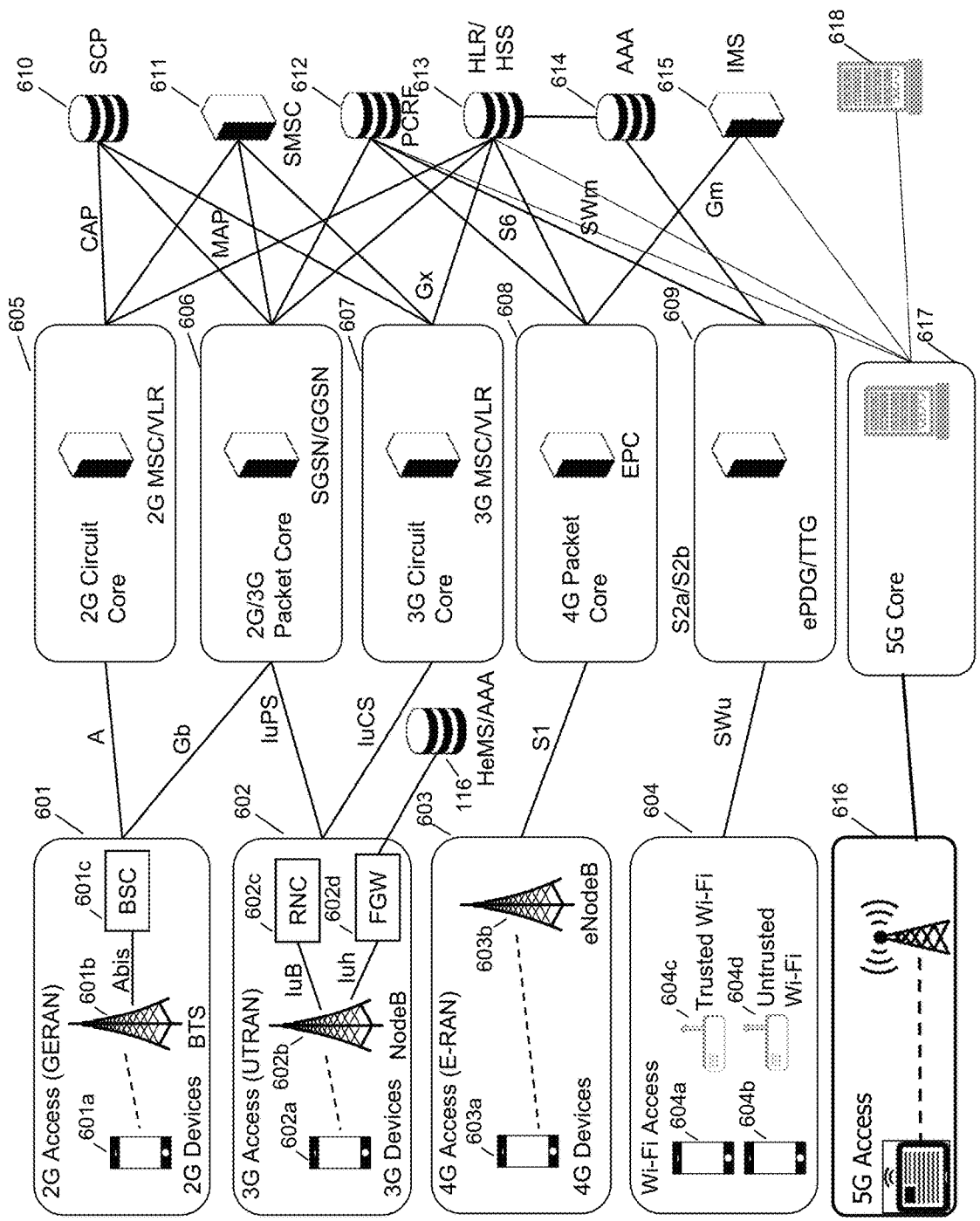
FIG. 6 shows a schematic network architecture diagram for 4G and other-G networks, in accordance with some embodiments.

FIG. 6 is a schematic network architecture diagram for 3G and other-G prior art networks. The diagram shows a plurality of "Gs," including 2G, 3G, 4G, 5G and Wi-Fi. 2G is represented by GERAN 601, which includes a 2G device 601*a*, BTS 601*b*, and BSC 601*c*. 3G is represented by UTRAN 602, which includes a 3G UE 602*a*, nodeB 602*b*, RNC 602*c*, and femto gateway (FGW, which in 3GPP namespace is also known as a Home nodeB Gateway or HNBGW) 602*d*. 4G is represented by EUTRAN or E-RAN 603, which includes an LTE UE 603*a* and LTE eNodeB 603*b*. Wi-Fi is represented by Wi-Fi access network 604, which includes a trusted Wi-Fi access point 604*c* and an untrusted Wi-Fi access point 604*d*. The Wi-Fi devices 604*a* and 604*b* may access either AP 604*c* or 604*d*. In the current network architecture, each "G" has a core network. 2G circuit core network 605 includes a 2G MSC/VLR; 2G/3G packet core network 606 includes an SGSN/GGSN (for EDGE or UMTS packet traffic); 3G circuit core 607 includes a 3G MSC/VLR; 4G circuit core 608 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 630, the SMSC 631, PCRF 632, HLR/HSS 633, Authentication, Authorization, and Accounting server (AAA) 634, and IP Multimedia Subsystem (IMS) 635. An HeMS/AAA 636 is present in some cases for use by the 3G UTRAN. The diagram is used to indicate schematically the basic functions of each network as known to one of skill in the art, and is not intended to be exhaustive. For example, 5G core 617 is shown using a single interface to 5G access 616, although in some cases 5G access can be supported using dual connectivity or via a non-standalone deployment architecture.

Noteworthy is that the RANs 601, 602, 603, 604 and 636 rely on specialized core networks 605, 606, 607, 608, 609, 637 but share essential management databases 630, 631, 632, 633, 634, 635, 638. More specifically, for the 2G GERAN, a BSC 601*c* is required for Abis compatibility with BTS 601*b*, while for the 3G UTRAN, an RNC 602*c* is required for Iub compatibility and an FGW 602*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 7:
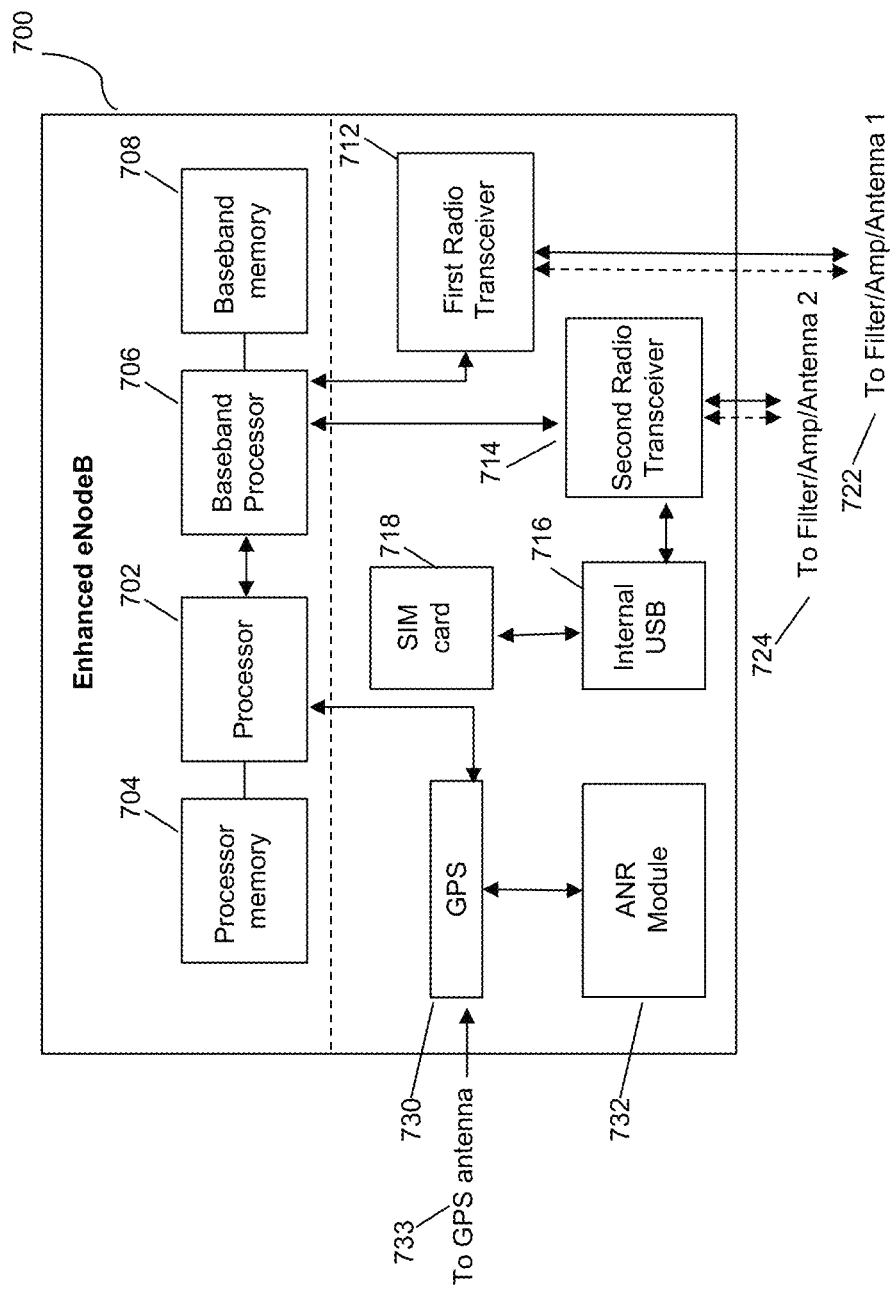
FIG. 7 is an enhanced eNodeB for performing the methods described herein, in accordance with some embodiments.

FIG. 7 is an enhanced eNodeB for performing the methods described herein, in accordance with some embodiments. eNodeB 700 may include processor 702, processor memory 704 in communication with the processor, baseband processor 706, and baseband processor memory 708 in communication with the baseband processor. Mesh network node 700 may also include first radio transceiver 712 and second radio transceiver 714, internal universal serial bus (USB) port 716, and subscriber information module card (SIM card) 718 coupled to USB port 716. In some embodiments, the second radio transceiver 714 itself may be coupled to USB port 716, and communications from the baseband processor may be passed through USB port 716. The second radio transceiver may be used for wirelessly backhauling eNodeB 700.

Processor 702 and baseband processor 706 are in communication with one another. Processor 702 may perform routing functions, and may determine if/when a switch in network configuration is needed. Baseband processor 706 may generate and receive radio signals for both radio transceivers 712 and 714, based on instructions from processor 702. In some embodiments, processors 702 and 706 may be on the same physical logic board. In other embodiments, they may be on separate logic boards.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 712 and 714. Baseband processor 706 may use memory 708 to perform these tasks.

The first radio transceiver 712 may be a radio transceiver capable of providing LTE eNodeB functionality, and may be capable of higher power and multi-channel OFDMA. The second radio transceiver 714 may be a radio transceiver capable of providing LTE UE functionality. Both transceivers 712 and 714 may be capable of receiving and transmitting on one or more LTE bands. In some embodiments, either or both of transceivers 712 and 714 may be capable of providing both LTE eNodeB and LTE UE functionality. Transceiver 712 may be coupled to processor 702 via a Peripheral Component Interconnect-Express (PCI-E) bus, and/or via a daughtercard. As transceiver 714 is for providing LTE UE functionality, in effect emulating a user equipment, it may be connected via the same or different PCI-E bus, or by a USB bus, and may also be coupled to SIM card 718. First transceiver 712 may be coupled to first radio frequency (RF) chain (filter, amplifier, antenna) 722, and second transceiver 714 may be coupled to second RF chain (filter, amplifier, antenna) 724.

SIM card 718 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 712 and 714, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 702 for reconfiguration.

A GPS module 730 may also be included, and may be in communication with a GPS antenna 732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 732 may also be present and may run on processor 702 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 8:
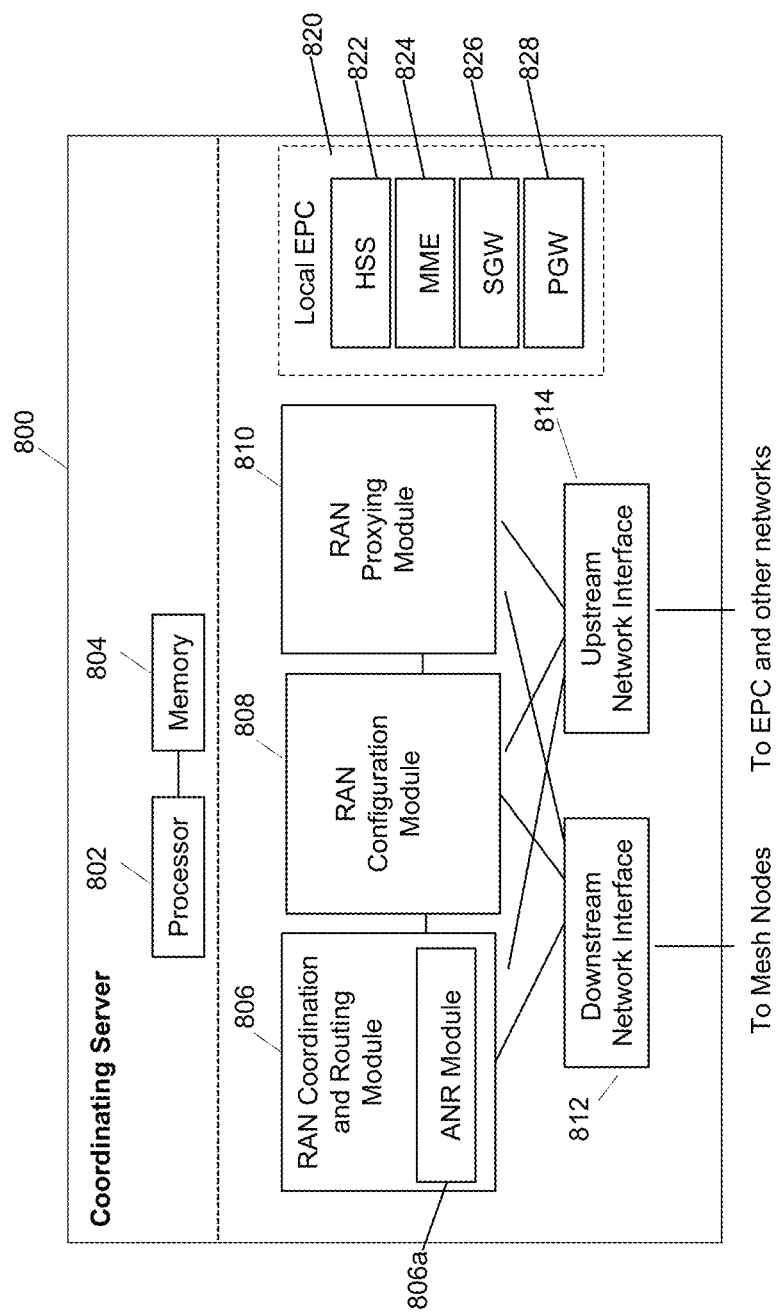
FIG. 8 is a coordinating server for providing services and performing methods as described herein, in accordance with some embodiments.

FIG. 8 is a coordinating server for providing services and performing methods as described herein, in accordance with some embodiments. Coordinating server 800 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

Coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system for providing Open RAN centralized unit-user plane (CU-UP) scaling, the system comprising:
   an active centralized unit-control plane (CU-CP);
   a CU-UP manager function in communication with the active CU-CP; and
   at least one CU-UP data plane function in communication with the CU-UP manager function;
   wherein when an overload threshold is met, an additional CU-UP data plane function is created, and the active CU-CP is requested to migrate at least one subscriber session to the additional CU-UP data plane function, thereby providing CU-UP scaling.

2. The system of claim 1, wherein the at least one CU-UP date plane function comprises a plurality of CU-UP data plane functions.

3. The system of claim 1, wherein the active CU-CP and active CU-UP date plane function are configured to provide service in a 4G/5G telecommunications network.

4. The system of claim 1, wherein the at least one CU-UP data plane function is configured to transfer state info to the additional CU-UP data plane function once created.

5. The system of claim 1, wherein the additional CU-UP data plane function is a cloud-native or containerized network function.

6. The system of claim 1, wherein the CU-UP manager function is a cloud-native or containerized network function and is co-located with the at least one CU-UP data plane function.

7. The system of claim 1, wherein one or more of the CU-CP, CU-UP manager function and CU-UP data plane function are provided in a container and orchestrated by a container orchestrator.

8. A method for providing Open RAN centralized unit-user plane (CU-UP) scaling, the method comprising:
   adding or deleting pods to a CU-UP cloud-native or containerized network function (CNF); and
   modifying subscriber sessions to take care of the added or deleted pods in a CU-UP;
   wherein each pod has its own F1-U or N3 data endpoint.

9. The method of claim 8, wherein adding or deleting new pods to a CU-UP CNF includes adding new pods to the CU-UP CNF when an overload threshold is met.

10. The method of claim 8, wherein modifying subscriber sessions to take care of the added or deleted pods in a CU-UP includes signaling to ensure the modified subscriber sessions utilize the added pods.

11. The method of claim 8, further comprising notifying, by an active centralized unit-control plane (CU-CP), at least one of a distributed unit or a core network of the added or deleted pods.

12. The method of claim 8, wherein modifying subscriber sessions to take care of the added or deleted pods in a CU-UP includes migrating subscriber sessions to an added pod.

13. The method of claim 8, further comprising providing, by at least one pod, a centralized unit-control plane (CU-CP).

14. The method of claim 8, further comprising providing, by at least one pod, a centralized unit-user plane (CU-CP) manager function.

15. A non-transitory computer-readable medium containing instructions for providing Open RAN centralized unit-user plane (CU-UP) scaling, which, when executed, cause a network component to perform steps comprising:
   adding or deleting pods to a CU-UP cloud-native or containerized network function (CNF); and
   modifying subscriber sessions to take care of the added or deleted pods in a CU-UP;
   wherein each pod has its own F1-U or N3 data endpoint.

16. The non-transitory computer-readable medium of claim 15, wherein adding or deleting new pods to a CU-UP CNF includes adding new pods to the CU-UP CNF when an overload threshold is met.

17. The non-transitory computer-readable medium of claim 15, wherein modifying subscriber sessions to take care of the added or deleted pods in a CU-UP includes signaling to ensure the modified subscriber sessions utilize the added pods.

18. The non-transitory computer-readable medium of claim 15, further comprising instructions, which when executed, cause notifying, by an active centralized unit-control plane (CU-CP), at least one of a distributed unit or a core network of the added or deleted pods.

19. The non-transitory computer-readable medium of claim 15, wherein further comprising instructions, which when executed, cause migrating of subscriber sessions to an added pod.

20. The non-transitory computer-readable medium of claim 15, further comprising instructions, which when executed, cause:
  providing, by at least one pod, a centralized unit-control plane (CU-CP); and
  providing, by at least one pod, a centralized unit-user plane (CU-CP) manager function.

* * * * *